United States Patent [19]

Shimizu et al.

[11] Patent Number: 4,720,982

[45] Date of Patent: Jan. 26, 1988

[54] MULTI-TYPE AIR CONDITIONER WITH OPTIMUM CONTROL FOR EACH LOAD

[75] Inventors: Keiichirou Shimizu, Fujinomiya; Yukifumi Gotou, Fuji, both of Japan

[73] Assignee: Kabushiki Kaisha Toshiba, Kawasaki, Japan

[21] Appl. No.: 923,643

[22] Filed: Oct. 27, 1986

[30] Foreign Application Priority Data

Oct. 28, 1985 [JP] Japan .............................. 60-240960

[51] Int. Cl.$^4$ .............................................. F24F 3/00
[52] U.S. Cl. ...................................... 62/204; 62/228.4; 165/22
[58] Field of Search ............... 236/49, 75; 165/22; 62/211, 175, 204, 228.4

[56] References Cited

U.S. PATENT DOCUMENTS

| | | | |
|---|---|---|---|
| 4,112,703 | 9/1978 | Kountz | 62/211 |
| 4,480,442 | 11/1984 | Ide et al. | 62/175 |
| 4,494,382 | 1/1985 | Raymond | 62/175 X |
| 4,509,586 | 4/1985 | Watabe | 62/211 |

FOREIGN PATENT DOCUMENTS

60-2536 1/1985 Japan .

Primary Examiner—William E. Wayner
Attorney, Agent, or Firm—Cushman, Darby & Cushman

[57] ABSTRACT

A multi-type air conditioner has an outdoor unit, a plurality of indoor units, a refrigeration cycle, an inverter, flow control valves, opening/closing valves, a first controller, a second controller, and a third controller. The outdoor unit has a variable-capability compressor, an outdoor heat exchanger, and a pressure decreasing unit. Each indoor unit has an indoor heat exchanger. The refrigeration cycle has the variable-capability compressor, the outdoor heat exchanger, the pressure decreasing unit, and a parallel combination of the respective indoor heat exchangers connected in series. The inverter supplies drive power of a predetermined frequency to the capability variable compressor. The flow rate control valves are provided to the liquid-side refrigerant pipes of the respective indoor heat exchangers. The opening/closing valves are provided to the gas-side refrigerant pipes of the respective indoor heat exchangers. The first controller controls the open factor of the respective flow control valves in accordance with the air-conditioning load of the respective indoor units. The second controller controls opening/closing of the opening/closing valves in accordance with the air-conditioning loads or the operation states of the respective indoor units. The third controller controls the output frequency of the inverter in accordance with the total air-conditioning load of the indoor units.

7 Claims, 15 Drawing Figures

MULTI-TYPE AIR CONDITIONER WITH OPTIMUM CONTROL FOR EACH LOAD

BACKGROUND OF THE INVENTION

The present invention relates to a multi-type air conditioner with an optimum control for each load and, more particularly, to a multi-type air conditioner with a heat pump-type refrigeration cycle for controlling a plurality of indoor units with a single outdoor unit.

A conventional air conditioner of this type controls the ON/OFF function of a capacity-fixed compressor provided within a single outdoor unit in accordance with temperature data from indoor temperature sensors respectively provided in a plurality of indoor units.

In this case, the plurality of indoor units are connected to the single outdoor unit through a distribution unit, so as to be parallel with each other. At the same time, the overall system constitutes a heat pump-type refrigeration cycle. More specifically, an outdoor unit, a liquid-side distribution unit, a plurality of indoor units, a gas-side distribution unit, and an accumulator are connected to a compressor in a looped manner through a 4-way valve. The outdoor unit comprises a capacity-fixed compressor, the 4-way valve for switching cooling/heating, an outdoor heat exchanger, a parallel combination of a cooling check valve and a heating expansion valve, and a liquid tank. The liquid-side distribution unit comprises a plurality of electromagnetic opening/closing valves. The indoor units comprise a cooling capillary tube and indoor heat exchanger, respectively. The gas-side distribution unit comprises a plurality of electromagnetic opening/closing valves. In the cooling mode, a refrigerant is flowed in the direction of the above connection order. In the heating mode, the refrigerant is flowed in the opposing direction to the connection order. A cooling/heating cycle is thus formed.

In the air conditioner described above, indoor temperature thermo circuits are respectively provided in the plurality of indoor units. For example, when the temperature of a room in which one indoor unit is installed reaches a set value and the indoor temperature thermo circuit of the loop is turned off, the liquid- and gas-side opening/closing valves of the loop are closed in order to stop flow of the refrigerant into the indoor heat exchanger of this indoor unit. When the indoor temperature thermo circuit is turned on by a change of the temperature caused by the operation interruption, the liquid- and gas-side opening/closing valves are opened in order to flow the refrigerant to the indoor heat exchanger. Note that a difference of 2 to 3 degrees is provided for turning on/off the indoor temperature thermo circuit.

When the conventional air conditioner is turned on/off, however, a variation in the room temperature is large, and comfort is thus degraded. In addition, when the compressor is turned off during cooling, the room temperature is increased, and the room may feel hot and humid. When the compressor is turned off during heating, the temperature of the air flow to the room is decreased, and a person in the room may feel cold.

In the other hand, a single type air conditioner for performing air conditioning by controlling a single indoor unit with a single outdoor unit, a variable control capability system has recently been adopted. More specifically, the air conditioner of this type variably controls the frequency of a compressor motor in accordance with the air-conditioning load state. With this air conditioner, the variation in the room temperature can be reduced compared to the case of the air conditioner of the ON/OFF control system, and the comfort can hence be improved. In addition, since the compressor motor is constantly driven, the non-effective power can be decreased compared to the case of the air conditioner of the ON/OFF control system. The energy-saving property is thus excellent.

When the variable control capability system is applied to a multi-type air conditioner, several problems must be solved, i.e., it must be studied in what manner the refrigeration cycle must be variably operated when a plurality of indoor units are controlled by a single outdoor unit. The problems include the conditions for variably driving the compressor motor and the arrangements of various types of valves. Another of the problems concerns the difference in the air-conditioning capability of the respective indoor units.

Conventionally, however, no effective answer has been given to these problems, and thus a multi-type air conditioner employing the variable capability control method has not been provided yet.

At present, since a multi-type air conditioner cannot but employ the ON/OFF control method, a variation in the room temperature is large, comfort is degraded, and the energy-saving property is also degraded.

SUMMARY OF THE INVENTION

It is, therefore, an object of the present invention to provide a new and improved multi-type air conditioner with an optimum control for each load which can obtain an optimum capability corresponding to the air-conditioning load of each indoor unit, can improve comfort by minimizing the variation in the room temperature, and can enhance the energy-saving property.

According to the present invention, there is provided a multi-type air conditioner with an optimum control for each load, comprising:

a single outdoor unit having at least an inverter for supplying drive power of a predetermined frequency, a compressor motor driven at a variable speed upon reception of the drive power from the inverter, a variable capability compressor coupled to the compressor motor, and an outdoor heat exchanger coupled to the compressor;

a plurality of indoor units each having at least an indoor heat exchanger and means for detecting an air-conditioning load of the indoor heat exchanger;

distributing means for parallel-connecting the single outdoor unit to the plurality of indoor units to constitute respective refrigeration cycles, the distributing means having at least a plurality of electromotion-type flow control valves provided at one end of the respective indoor units and a plurality of electromagnetic opening/closing valves provided to the other end of the respective indoor units;

first control means for receiving detection results from the respective air-conditioning load detecting means and producing first predetermined control signals for respectively controlling the open factors of the plurality of electromotion-type flow control valves in accordance with the respective detection results;

second control means for receiving detection results from the respective air-conditioning load detecting means and producing second predetermined control signals for respectively controlling the open factors of the plurality of electromagnetic opening/closing valves in accordance with the respective detection results; and third control means for receiving detection results from the respective air-conditioning load detecting means, calculating a total air-conditioning load of the respective indoor heat exchangers in accordance with the detection results, and producing third predetermined control signals for controlling an output frequency of the inverter in accordance with the total air-conditioning load.

BRIEF DESCRIPTION OF THE DRAWINGS

These and other objects and features of the present invention can be understood through following embodiments by reference to the accompanying drawings, in which.

DETAILED DESCRIPTION OF THE PREFERRED EMBODIMENTS

Several preferable embodiments of the present invention will be described with reference to the accompanying drawings.

Figure 1:
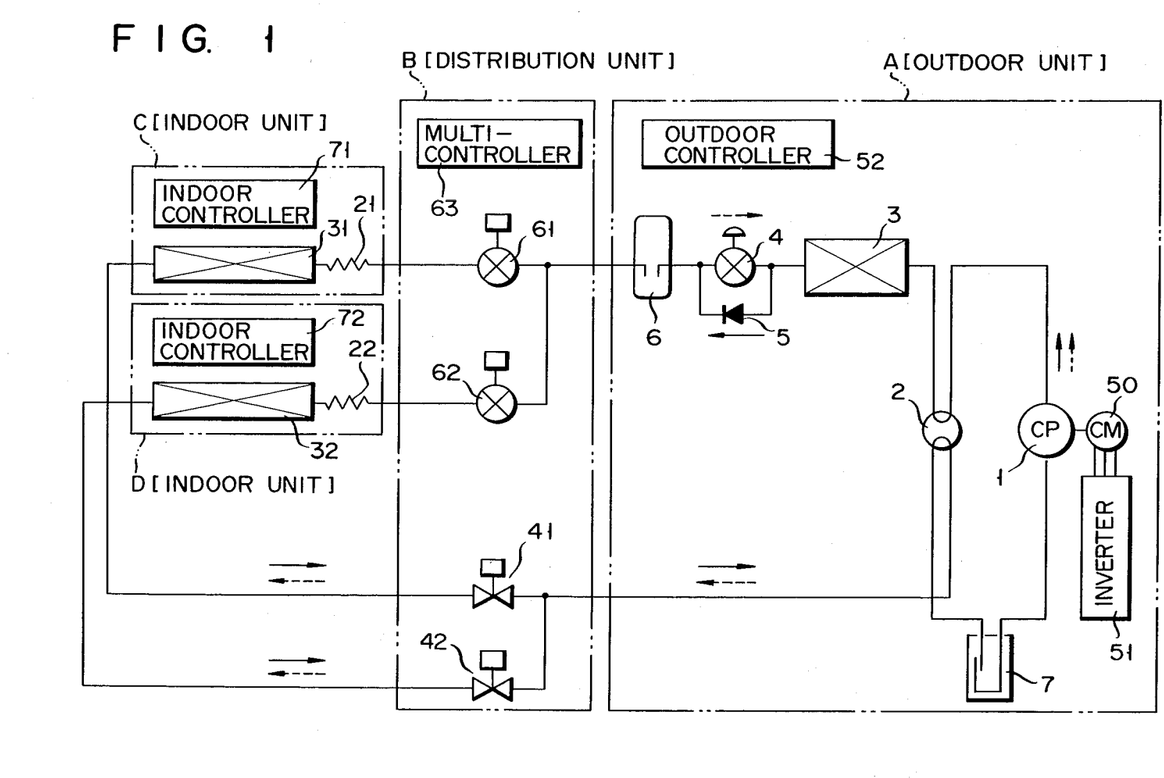
FIG. 1 shows the configuration of a refrigeration cycle of a first embodiment of the present invention.

Referring to FIG. 1 showing the first embodiment, reference symbol A denotes an outdoor unit; B, a distribution unit; and C and D, indoor units. Outdoor unit A, liquid-side distribution unit B, indoor unit C, a gas-side distribution unit B, and indoor unit D are connected in a looped manner to constitute a heat pumptype refrigeration cycle. Outdoor unit A comprises variable-capability compressor 1, 4-way valve 2, outdoor heat exchanger 3, a parallel combination of heating expansion valve 4 and check valve 5, liquid tank 6, and accumulator 7. Liquid-side distribution unit B comprises liquid-side opening/closing valves (electromotion-type flow control valves) 61 and 62. Indoor units C and D comprise cooling capillary tubes 21 and 22 and indoor heat exchangers 31 and 32, respectively. Gas-side distribution unit B comprises gas-side opening/closing valves (electromagnetic opening/closing valves) 41 and 42. Namely, heat exchangers 31 and 32 are connected in parallel to each other. In the cooling mode, a refrigerant flows in the direction of the solid arrow in FIG. 1 to form a cooling cycle. In the heating mode, 4-way valve 2 is switched to flow the refrigerant in the direction of the broken arrow in FIG. 1 to form a heating cycle.

A difference between the above configuration and that of a conventional multi-type air conditioner will be described. As shown in FIG. 1, variable capability-compressor 1 is provided in unit A. At the same time, inverter 51 for supplying drive power having a predetermined voltage and frequency to motor 50 of compressor 1 is also provided in unit A. Electromotion-type flow control valves 11 and 12 are provided as liquid-side opening/closing valves in unit B. Outdoor controller 52, multi-controller 63, and indoor controllers 71 and 72 are provided in units A, B, and C and D, respectively.

Figure 2A:
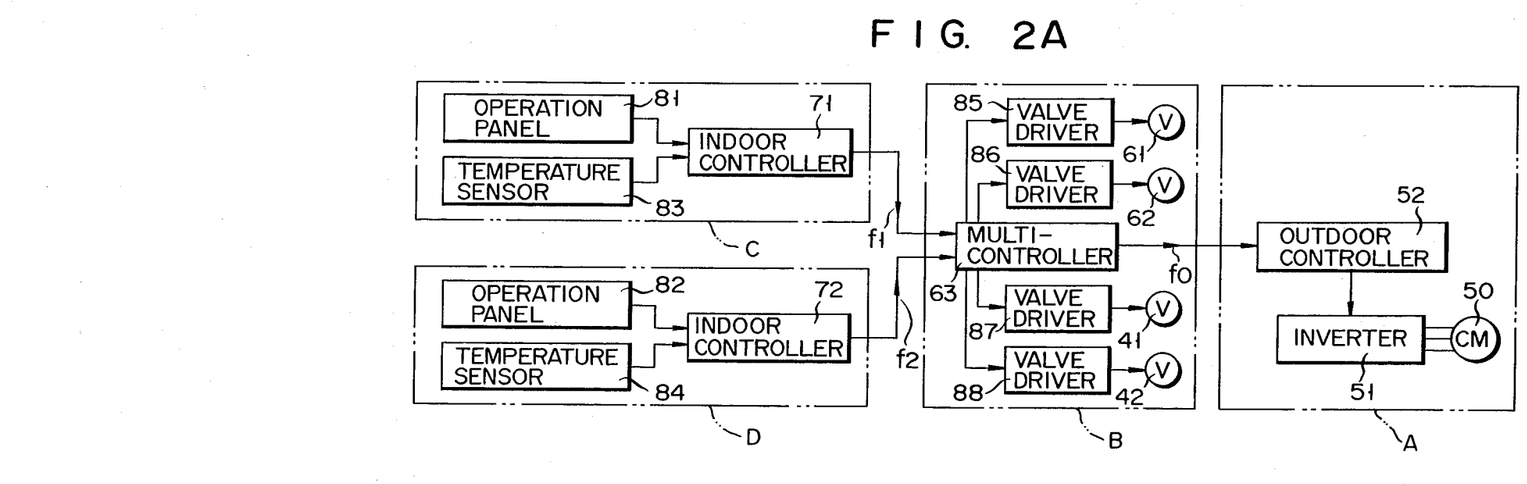
FIG. 2A shows the configuration of a controller of the first embodiment of the present invention.

FIG. 2A shows the connection state of the control system of the configuration shown in FIG. 1.

Operation panels 81 and 82, and indoor temperature sensors 83 and 84 are connected to indoor controllers 71 and 72, respectively. Valve drivers 85 and 86 are connected to multi-controller 63, and electromotion-type flow control valves 61 and 62 are connected to valve drivers 85 and 86, respectively. Valve drivers 87 and 88 are connected to multi-controller 63, and gas-side opening/closing valves 41 and 42 are connected to valve drivers 87 and 88, respectively. Inverter 51 is connected to out-door controller 52.

Controllers 52, 63, 71, and 72 respectively comprise microcomputers and peripheral circuits. Controllers 71 and 72 supply various types of serial control signals to multi-controller 63. Multi-controller 63 supply various types of serial control signals to outdoor controller 52.

Figure 2B:
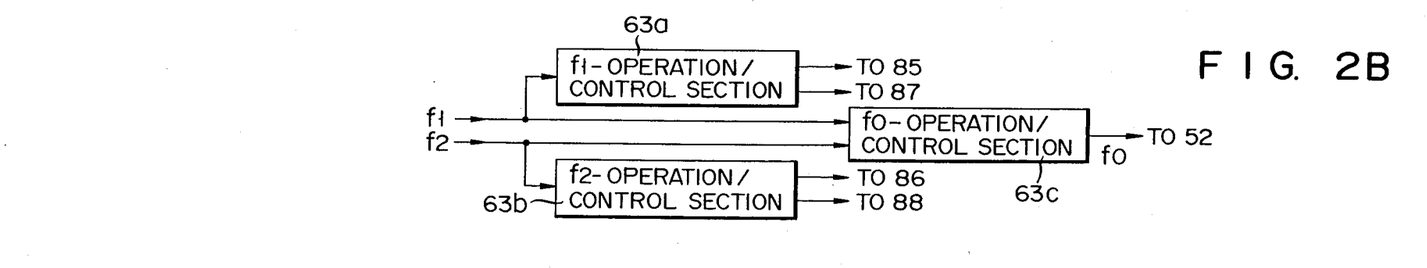
FIG. 2B shows a multi-controller shown in FIG. 2A in detail.

FIG. 2B shows the control function of multi-controller 63 which is roughly divided into f1, f2, and f0 operation/control sections 63a, 63b, and 63c. The contents of sections 63a to 63c will be described later.

The operation of the air conditioner having the above configuration will now be described.

Figure 3:
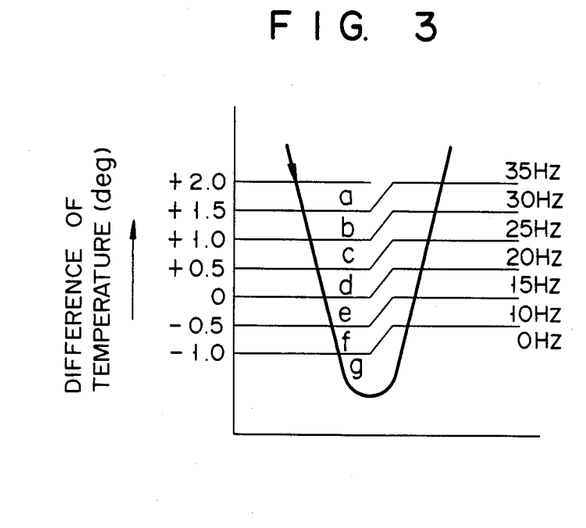
FIGS. 3 and 4 show operation frequency setting conditions, respectively, of the first embodiment of the present invention.

Assume that both the indoor units C and D perform a cooling operation. Indoor controller 71 of unit C calculates the difference (Ta−Ts) between temperature Ta detected by sensor 83 and temperature Ts preset by operation panel 81 in order to detect an air-conditioning load to heat exchanger 31, and supplies frequency setting signal f1 corresponding to the temperature difference to multi-controller 63 as a demand cooling capability corresponding to the air-conditioning load to heat exchanger 31. In this case, for example, when the temperature difference falls within a range of +1.0 to +1.3 deg., as shown in FIG. 3, it is determined as region b and controller 71 outputs signal f1 corresponding to operation frequency 30 Hz. Further, when the temperature difference falls within a range of −0.5 to −1.0 deg., it is determined as region f and controller 71 outputs signal f1 corresponding to operation frequency 10 Hz. In the same manner, indoor controller 72 of indoor unit D also outputs frequency setting signal f2 as a demand capability corresponding to the air-conditioning load to heat exchanger 32, and signal f2 is supplied to multi-controller 63.

Figure 4:
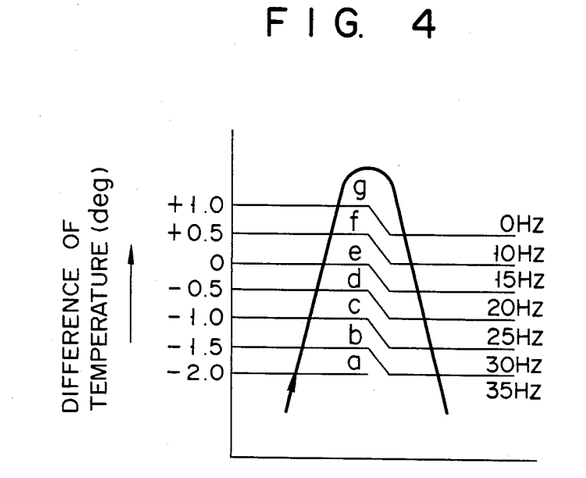

In the heating mode, signals f1 and f2 are output in accordance with the operation frequency setting conditions of FIG. 4, for example.

Figure 5:
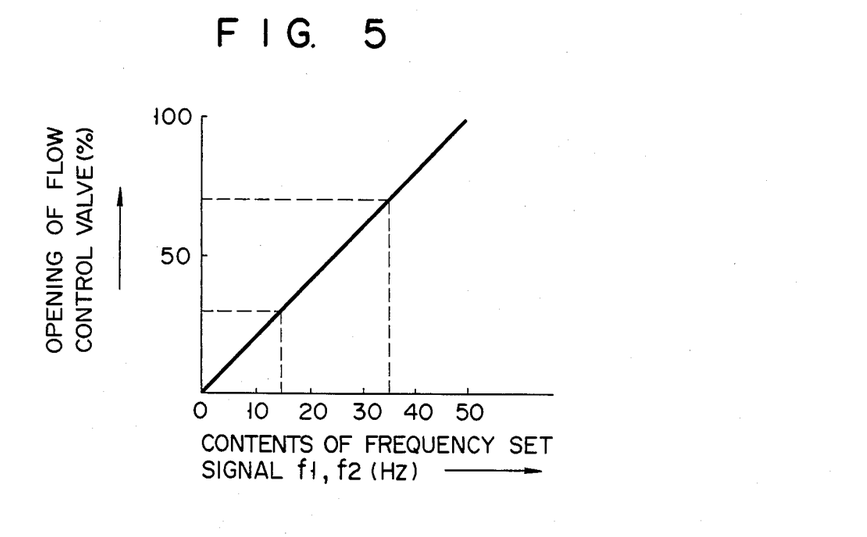
FIG. 5 is a graph for explaining the open factor control of a flow control valve of the first embodiment of the present invention.
Figure 6:
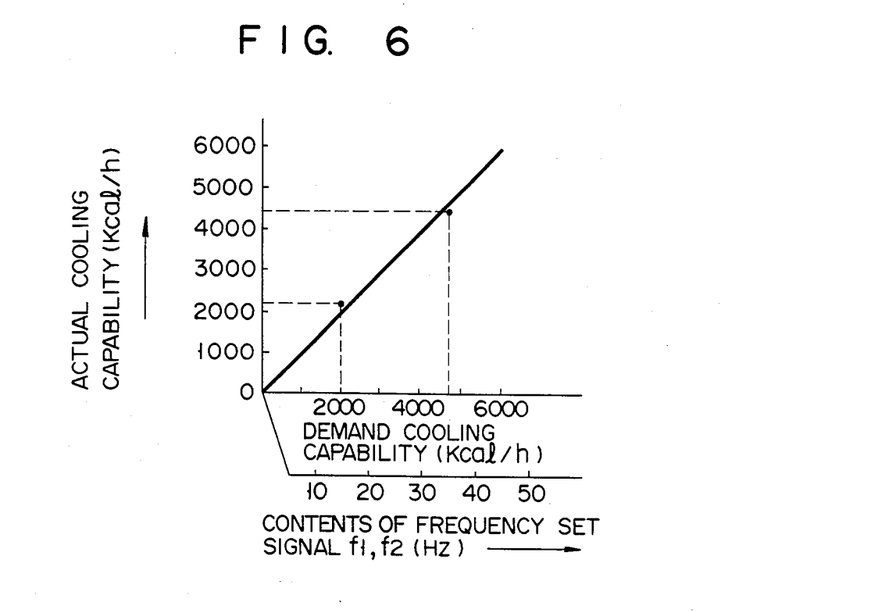
FIG. 6 is a graph for explaining a relationship between demand cooling capabilities and actual cooling capabilities of the respective indoor units of the first embodiment of the present invention.

When the content of signal f1 is other than 0 Hz, f1 operation/control section 63a of multi-controller 63 controls flow control valve 61 with a corresponding open factor through valve driver 86 and controls gas-side opening/closing valve 41 with an open state through valve driver 87. However, when signal f1 is not supplied or the content of signal f1 is 0 Hz since unit C stops operation, section 63a controls valves 61 and 41 to be in a closed state. When the content of signal f2 is other than 0 Hz, f2 operation/control section 63b of multi-controller 63 controls valve 62 with a corresponding open factor through valve driver 86 and controls valve 42 to be in an open state through valve driver 88. When signal f2 is not supplied or the content of signal f2 is 0 Hz since unit D stops operation, section 63b control valves 62 and 42 with close states. FIG. 5 shows a relationship between the contents of signals f1 and f2, which are calculated by sections 63a and 63b, and the open factors of valves 61 and 62. When the content of signal f1 is 15 Hz, the open factor of valve 61 is about 30%; when the content of signal f2 is 35 Hz, the open factor of valve 62 is about 70%.

f0 operation/control section 63c of multi-controller 63 also calculates a total of the contents of signals f1 and f2, i.e., the demand capabilities of respective units C and D, in order to determine the capability of compressor 1 to correspond to the respective air-conditioning loads described above, and supplies frequency setting signal f0 corresponding to the calculated total to outdoor controller 52. In this case, when the content of signals f1 and f2 are 15 and 35 Hz, respectively, as described above, frequency setting signal f0 corresponding to 50 Hz as their total is output.

Outdoor controller 52 controls switching of inverter 51 in accordance with supplied signal f0, and causes inverter 51 to output AC power of the same frequency as the content of signal f0 to compressor motor 50. This allows compressor 1 to operate in accordance with the variable capability control method with a capability corresponding to the total of the respective air-conditioning loads of units C and D.

At this time, if the cooling operation is performed, the demand cooling capability of unit C is 2,000 kcal/h under the JIS (Japanese Industrial Standard) conditions (27° C. by the dry bulb and 19.5° C. by the wet bulb), and that of unit D is 4,700 kcal/h under these conditions, while the actual cooling capabilities of units C and D are 2,200 kcal/h and 4,500 kcal/h (actual measurement), respectively, thus obtaining a good coincidence. A similar result can be obtained when the heating operation is performed.

Figure 7:
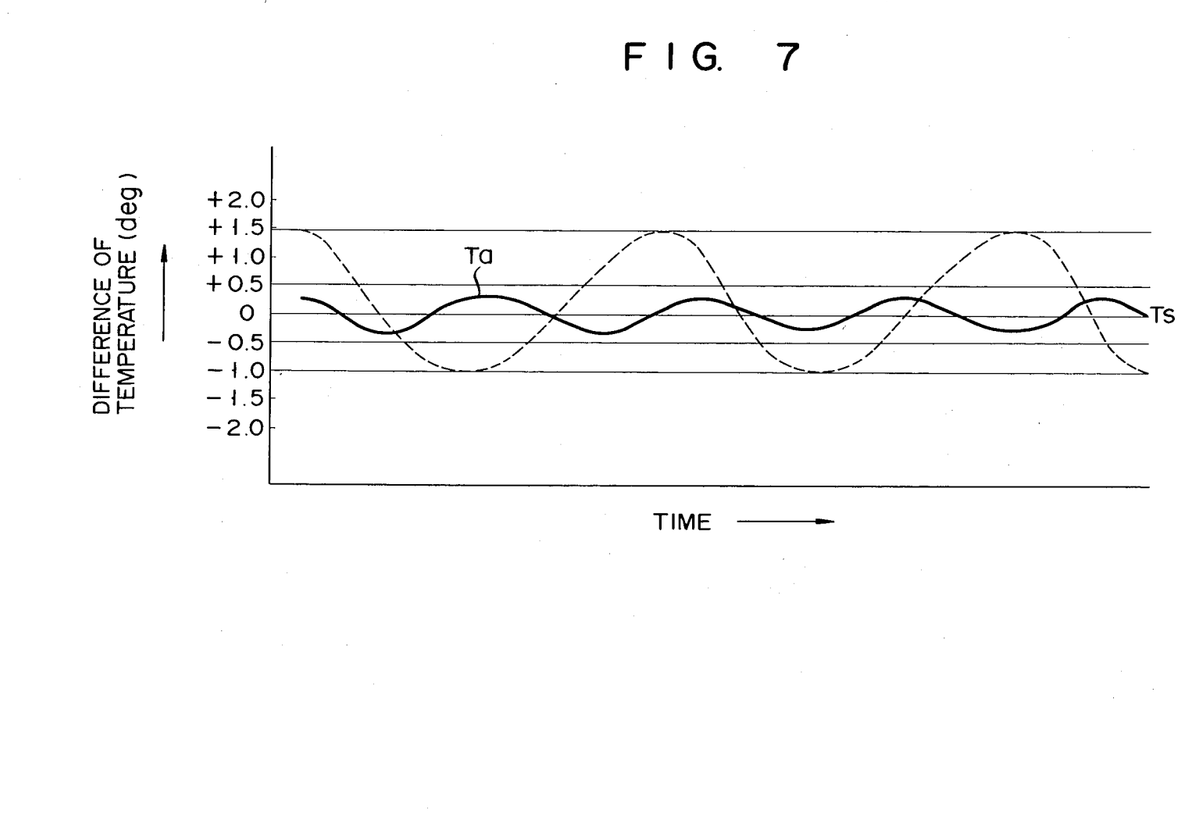
FIG. 7 shows changes in the room temperatures of the first embodiment of the present invention.

As described above, according to the present invention, compressor 1 is operated with a capability corresponding to the total of the air-conditioning loads of units C and D. The open factors of flow control valves 61 and 62 are controlled in accordance with the air-conditioning loads of units C and D. The refrigerant is flowed to indoor heat exchangers 31 and 32 at an appropriate flow rate corresponding to the open factors of valves 61 and 62. Therefore, variation in the room temperature can be minimized, leading to a great improvement in comfort. FIG. 7 shows an actual change in the room temperature. Room temperature Ta can be maintained within a range of ±0.5 deg. with preset temperature Ts as its center. Note that the broken line in FIG. 7 denotes a conventional change in the room temperature. Particularly, since the operation is substantially free from turning on/off unlike in the conventional ON/OFF control system, a person in the room may not feel hot and humid during the cooling operation or may not feel cold during the heating operation. In addition, since substantially no non-effective power is consumed by an ON/OFF operation of the compressor, the energy-saving property is enhanced.

In the above embodiment, the content of frequency setting signal f0 is set as the total of the contents of frequency setting signals f1 and f2. However, signal f0 can be corrected as required to correspond to the actual refrigeration cycle.

Figure 8:
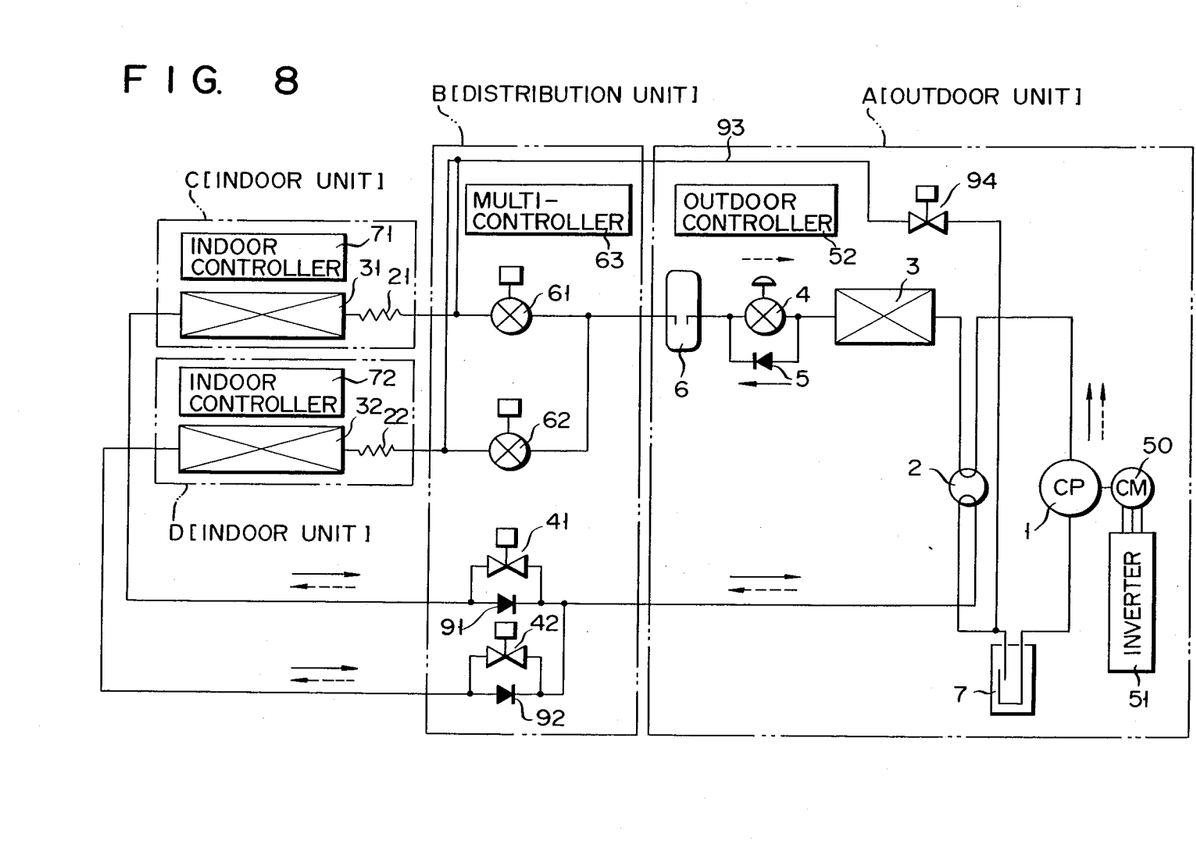
FIG. 8 shows the configuration of a refrigeration cycle of a second embodiment of the present invention.

The present invention can be changed, as the second embodiment is shown in FIG. 8. Referring to FIG. 8, the same reference numerals denote the same parts as in FIG. 1, and a detailed description thereof is omitted.

More particularly, as shown in FIG. 8, check valves 91 and 92 are connected in parallel to gas-side opening/closing valves 41 and 42 in order to allow a refrigerant from indoor heat exchangers 31 and 32 to flow therethrough during the cooling operation. Refrigerant return cycle 93 is provided between the liquid-side refrigerant pipes of exchangers 31 and 32 and a suction-side refrigerant pipe of compressor 1 through electromagnetic opening/closing valve 94. When valve 94 is opened while the operation of indoor units C and D is stopped, the refrigerant remaining in exchangers 31 and 32 is returned to compressor 1 by opening valve 94. The refrigeration cycle having the above arrangement can be put into practice as the first embodiment described above.

A third embodiment of the present invention will be described. More particularly, in the third embodiment the demand capabilities of the respective indoor units are corrected in consideration to the capacities of the outdoor or indoor heat exchangers, and the open factor of the flow control valve and the capability of the compressor are controlled in accordance with the corrected demand capabilities.

Figure 9:
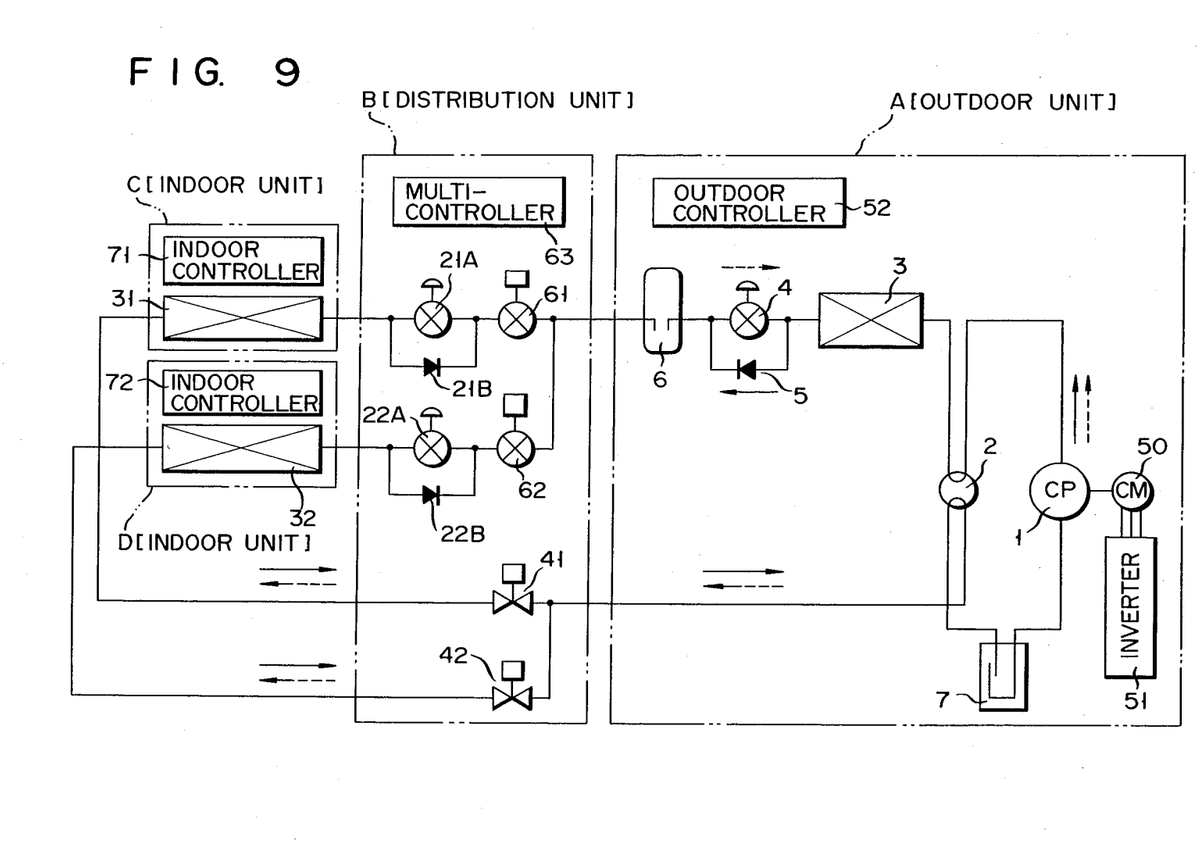
FIG. 9 shows the configuration of a refrigeration cycle of a third embodiment of the present invention.

FIG. 9 shows the third embodiment of the present invention. The same reference numerals in FIG. 9 denote the same part as in FIG. 1, and a detailed description thereof is omitted. Cooling capillary tubes 21 and 22 of indoor units C and D, respectively, of FIG. 1 are replaced by parallel members of cooling expansion valves 21A and 22A and check valves 21B and 22B of distribution unit B in FIG. 9. The connection state of the control system of the third embodiment is similar to that of FIG. 2. However, mainly, multi-controller 63 is controlled in a different manner from that of the first embodiment, as will be described later.

Figure 10:
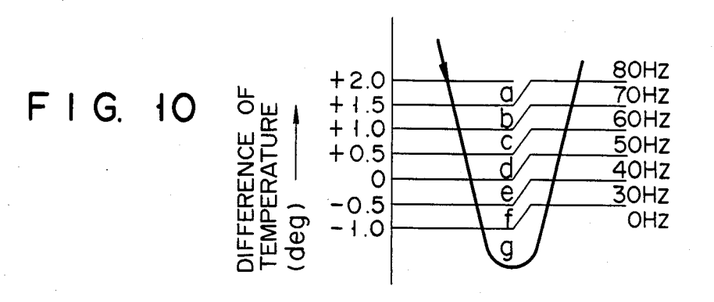
FIGS. 10 and 11 show operation frequency setting conditions, respectively, of the third embodiment of the present invention.

Assume that both of the indoor units C and D perform cooling operation. At this time, indoor controller 71 of indoor unit C calculates difference (Ta−Ts) between temperature Ta detected by indoor temperature sensor 83 and temperature Ts preset by operation panel 81, and transfers frequency setting signal f1 corresponding to the obtained temperature difference to multi-controller 63 as a demand cooling capability. In this case, for example, when the temperature difference falls within a range of +1.0 to +1.5 deg., as shown in FIG. 10, it is determined as region b, and signal f1 corresponding to operation frequency 70 Hz is output. When the temperature difference falls within a range of −0.5 to −1.0 deg., it is determined as region f, and signal f1 corresponding to operation frequency 30 Hz is output.

In a similar manner, frequency setting signal f2 is output from indoor controller 72 of indoor unit D and is transferred to multi-controller 63 as the demand cooling capability.

Figure 11:
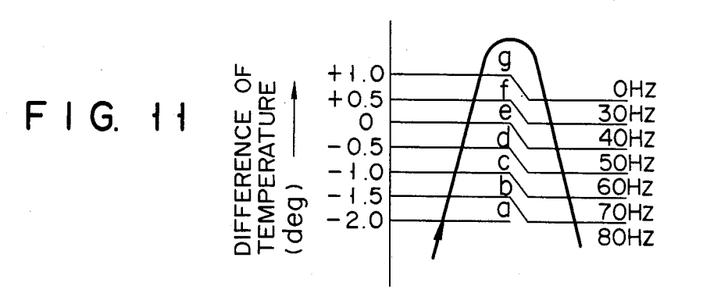

During heating operation, for example, signals f1 and f2 are output in accordance with the operation frequency setting conditions shown in FIG. 11 and are transferred to multi-controller 63 as the demand heating capability.

Multi-controller 63 corrects the content of signal f1 transferred by f1 operation/control section 63a with a ratio of capacity P1 of indoor heat exchanger 31 to capacity P0 of outdoor heat exchanger 3 as described below, and controls flow control valve 61 and gas-side opening/closing valve 41 in accordance with obtained correcting value F1 (correction demand cooling capability):

$$F1 = f1 \cdot P1/P0$$

In this case, when correcting value F1 is other than 0 Hz, section 63a controls valve 61 with a corresponding open factor through valve driver 86, and controls valve to be in an open state through valve driver 87. When value F1 is 0 Hz, section 63a controls valves 61 and 41 with close states.

Multi-controller 63 corrects signal f2 with a ratio of capacity P1 of exchanger 31 to capacity P0 of exchanger 3 by section 63b, and controls flow control and gas-side opening/closing valves 62 and 42 in accordance with obtained correcting value F2 (correcting demand cooling capability) through valve drivers 86 and 88:

$$F2 = f2 \cdot P1/P0$$

Figure 12:
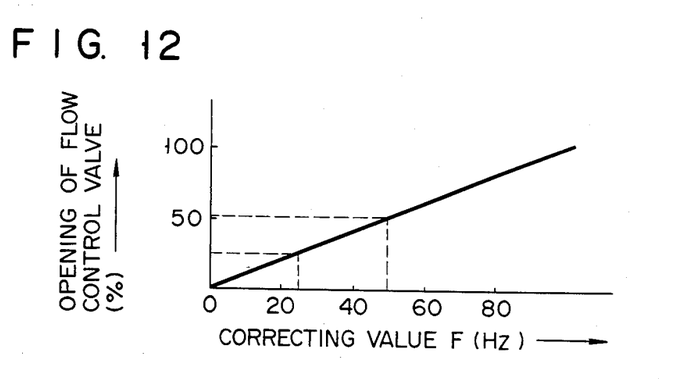
FIG. 12 is a graph for explaining the open factor control of a flow control valve of the third embodiment of the present invention.

At this time, assuming that capacity P0 (capacity at maximum performance of compressor 1) of exchanger 3 is 5 HP, capacity P1 of exchanger 31 is 2 HP, capacity P2 of exchanger 32 is 3 HP, the content of signal f1 is 60 Hz, and the content of signal f2 is 80 Hz, F1 = 24 Hz, F2 = 48 Hz FIG. 12 shows a relationship between correcting values F1 and F2 calculated by sections 63a and 63b and the open factor of valves 61 and 62. More particularly, when value F1 is 24 Hz, the open factor of valve 61 is about 33%; when value F2 is 48 Hz, the open factor of valve 62 is about 56%.

Multi-controller 63 calculates the total of correcting values F1 and F2 by f0 operation/control section 63c and transfers corresponding frequency setting signal f0 to outdoor controller 52. In this case, when values F1 and F2 are 24 Hz and 48 Hz, respectively, as described above, multi-controller 63 outputs signal f0 corresponding to the total thereof, i.e., 72 Hz.

Outdoor controller 52 performs switching of inverter 51 in accordance with transferred frequency setting signal f0, and outputs AC power having the same frequency as the content of signal f0 from inverter 51. More particularly, controller 52 controls the capability of motor 50 of compressor 1 with a demand cooling capability obtained by adding the capacities of exchangers 3, 31 and 32 to the demand cooling capabilities of units C and D.

Figure 13:
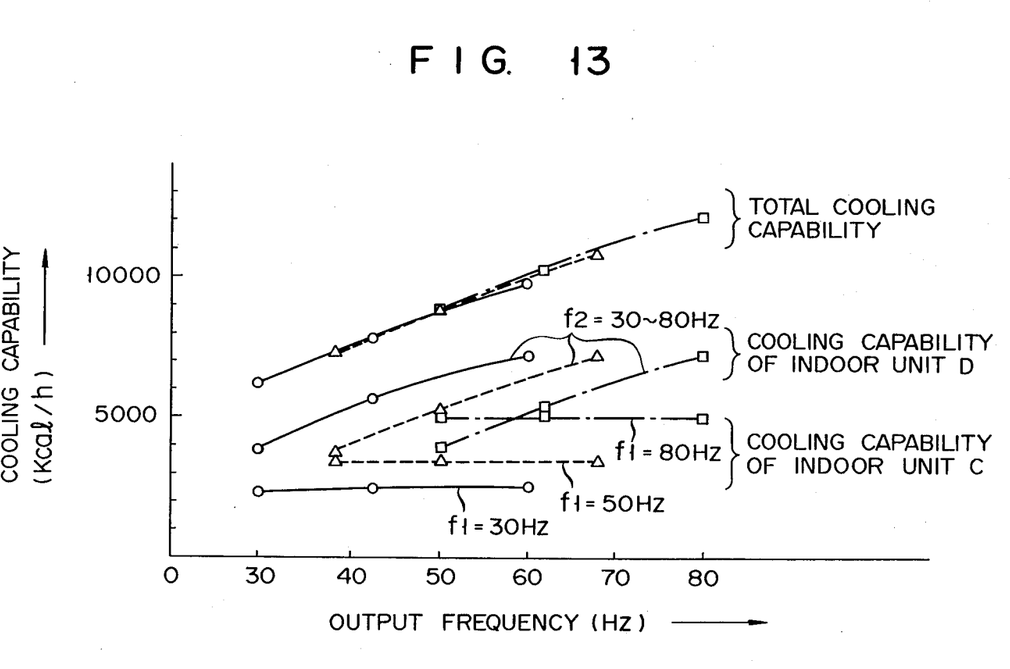
FIGS. 13 and 14 are graphs showing the cooling capabilities of the respective indoor units of the second embodiment of the present invention.
Figure 14:
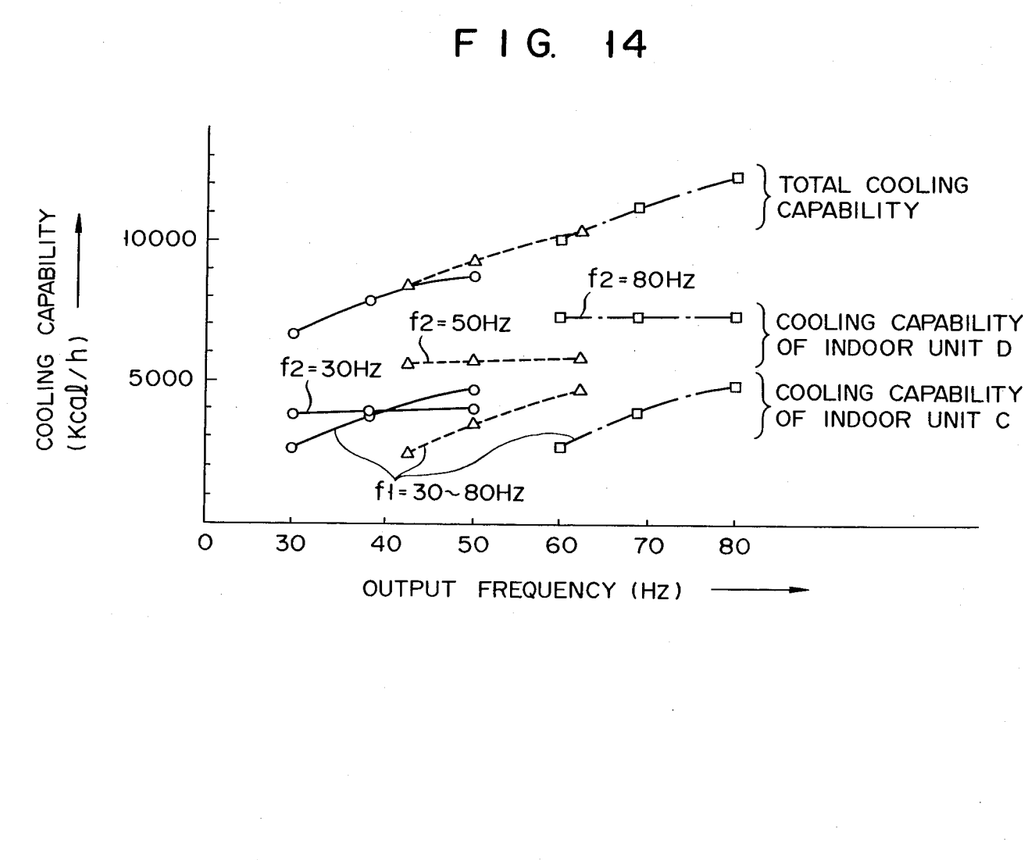

Assume that signal f2 of outdoor unit D changes between 30 and 80 Hz. Then, the cooling capability and the total cooling capability of the respective indoor units are as shown in FIG. 13 when signal f1 of unit C is taken as a parameter. Conversely, when signal f1 of unit C changes between 30 and 80 Hz, the cooling capability and the total cooling capability of the respective indoor units are as shown in FIG. 14 when signal f2 of unit D is taken as a parameter. In FIGS. 13 and 14, the output frequency of inverter 51 is plotted along the axis of abscissa. Namely, according to the measurement data of FIGS. 13 and 14, when the capability of an indoor unit must be variable, it can be changed between about 60 and 100% to correspond to the air-conditioning load. When the capability of an indoor unit need not be variable, it can be maintained substantially constant without being influenced by a change in the capability of the other indoor unit.

As described above, the demand capabilities of the indoor units C and D are corrected based on their air-conditioning loads in consideration of the capacities of the outdoor and indoor heat exchangers. Also, the open factors of valves 61 and 62 and the capability of motor 50 of compressor 1 are controlled in accordance with the corrected demand capabilities. Therefore, an optimum capability corresponding to the air-conditioning loads of the room where units C and D are installed can be obtained, and a variation in the room temperature with respect to a preset temperature can be minimized. Thus, comfort can be greatly improved. Particularly since an ON/OFF control is not repetitively performed, as is done by the conventional air conditioner, a person in the air-conditioned room may not feel hot and humid during a cooling operation nor cold during a heating operation. Furthermore, since substantially no non-effective power is consumed by an ON/OFF operation of the compressor, the energy-saving property can be enhanced. In addition, the indoor units can be arbitrarily combined, and an indoor unit with an optimum capacity can be installed to correspond to the space to be air conditioned for each user.

In the above embodiments, indoor controllers 71 and 72 output frequency setting signals f1 and f2, respectively. However, controllers 71 and 72 can output only a temperature difference signal corresponding to the temperature difference, and multi-controller 63 can determine the demand capability of the respective indoor units. In the above embodiments, two indoor units are used. However, three or more indoor units can be used in a similar manner. Also, cooling expansion valves 21A and 21B are used as pressure-reducing units in the third embodiment. However, cooling capillary tubes can be used instead. The cooling capillary tubes are provided in distribution unit B but can be provided in indoor units C and D. Furthermore, this invention may be applied in case of a difference between the capability of the outdoor unit and the total capability of the respectively indoor units.

As described above, according to the air conditioner of the present invention, an optimum capability corresponding to the air-conditioning loads of the respective indoor units oan be obtained. The variation in the room temperature can thus be minimized to improve coman air-conditioned room. Furthermore, the energy-saving property can be enhanced.

What is claimed is:

1. A multi-type air-conditioner with an optimum control for each load, comprising:
   a single outdoor unit having at least an inverter for supplying drive power of a predetermined frequency, a compressor motor driven at a variable speed upon reception of the drive power from said inverter, a variable-capability compressor coupled to said compressor motor, and an outdoor heat exchanger coupled to said compressor;

a plurality of indoor units each having at least an indoor heat exchanger and means for detecting an air-conditioning load of said indoor heat exchanger, each said air-conditioning load detecting means comprising means for setting a desired temperature, means for detecting a room temperature, and means for producing a detected temperature signal, the frequency of the detected temperature signal corresponding to the difference between the desired temperature and the detected room temperature;

distributing means for parallel-connecting said single outdoor unit to said plurality of indoor units to constitute respective refrigeration cycles, said distributing means having at least a plurality of electromotion-type flow control valves provided at one end of said respective indoor units and a plurality of electromagnetic opening/closing valves provided to the other end of said respective indoor units;

first control means for receiving each said detected temperature signal from each said detected temperature signal producing means and producing first a corresponding predetermined control signal for respectively controlling the degree of opening of each of said plurality of electromotion-type flow control valves to a predetermined value in accordance with the respective detected temperature signal;

second control means for receiving each said detected temperature signal from each said detected temperature signal producing means and producing a corresponding second predetermined control signal for respectively controlling the opening and closing states of each of said plurality of electromagnetic opening/closing valves in accordance with the respective detected temperature signal; and third control means for receiving all of the detected temperature signals from said detected temperature signal producing means, calculating a total air-conditioning load of said respective indoor heat exchangers in accordance with the detected temperature signals, and producing third predetermined control signals for controlling an output frequency of said inverter in accordance with the total amount of detected temperature signals corresponding to total air-conditioning load.

2. An air conditioner according to claim 1, wherein said single outdoor unit further comprises an accumulator having one end connected to one end of said compressor, a 4-way valve having one end coupled between the other end of said compressor and one end of said outdoor heat exchanger and the other end connected to the other end of said accumulator, heating expansion and check valves each having one end connected to the other end of said outdoor heat exchanger, to be parallel to each other, and a liquid tank having one end connected to the other end of each of said expansion and check valves.

3. An air conditioner according to claim 1, wherein one end of each of said respective indoor units and said plurality of electromotion-type flow control valves are connected through a cooling capillary tube.

4. An air conditioner according to claim 1, wherein one end of each of said respective indoor units and said plurality of electromotion-type flow control valves are connected through a parallel combination of a cooling expansion valve and a check valve.

5. An air conditioner according to claim 1, wherein check valves are connected to said plurality of electromagnetic opening/closing valves, respectively, to allow a refrigerant from said respective indoor heat exchangers to flow therethrough during cooling operation.

6. An air conditioner according to claim 1, wherein electromagnetic opening/closing valves are provided between said respective indoor heat exchangers and said compressor in order to form a refrigerant return cycle when an operation of said respective indoor units is stopped.

7. An air conditioner according to claim 1, wherein said air conditioner further comprises means for correcting a demand capability of said respective indoor units with a ratio of a capacity of each of said indoor heat exchangers to a capacity of said outdoor heat exchanger, and said first to third control means receive corrected demand capabilities corrected by said demand capability correcting means in place of the detection results.

* * * * *